United States Patent [19]
Dembovsky

[11] 3,747,669
[45] July 24, 1973

[54] FURNACE FOR THE SMELTING OF METALS AND PREPARATION OF MATERIALS WITH HIGH MELTING POINTS

[75] Inventor: Vladimir Dembovsky, Ostrava, Czechoslovakia

[73] Assignee: Vyxoka skola banska, Ostrava, Czechoslovakia

[22] Filed: Jan. 28, 1972

[21] Appl. No.: 221,527

[30] Foreign Application Priority Data
Feb. 9, 1971 Czechoslovakia .................. 926/71

[52] U.S. Cl. .................... 164/348, 266/33, 432/161
[51] Int. Cl. ............................................. F27b 14/00
[58] Field of Search ................... 263/10, 11, 14, 47, 263/48

[56] References Cited
UNITED STATES PATENTS
2,958,520  11/1960  Fritz ................................... 263/11
3,067,139  12/1962  Goorissen ........................... 263/48
3,437,327  4/1969   Day et al. ......................... 263/11 X
3,554,512  1/1971   Elliott ................................ 263/48

*Primary Examiner*—John J. Camby
*Attorney*—Arthur O. Klein

[57] ABSTRACT

Furnace for the smelting of metals and preparation of materials with high melting points; the furnace is fitted with a horizontal trough-shaped crystallizer which has at least two working cylinders. The trough is closed at its ends by end plates. The working cylinders are driven to revolve in the same direction of rotation. The crystallizer insures perfect fusion of the whole charge and a smooth surface of the resultant cylindrical ingot while preserving a protective layer of cooler material adjacent to the walls of the crystallizer.

5 Claims, 4 Drawing Figures

PATENTED JUL 24 1973  3,747,669

FURNACE FOR THE SMELTING OF METALS AND PREPARATION OF MATERIALS WITH HIGH MELTING POINTS

The object of this invention is a furnace for the smelting of metals and preparation of materials with high melting points in a crystallizer consisting of a system of cylinders which revolve in the same direction.

Various previously known smelting furnaces incorporate metallic crystallizers in the shape of cylindrical vessels with movable bottoms or in the shape of pans or troughs. For instance, Czechoslovak Pat. specification No. 135,939 describes a plasma furnace for the smelting of metals and production of ingots which features a fixed horizontal crystallizer made up of a number of tubes arranged so as to form a trough. The crystallizer is terminated in the lengthwise direction by end plates and is located within the plasma furnace. Horizontal crystallizers which form pans or troughts suffer drawbacks in that the high dissipation of heat into the vessel walls permits only a relatively small quantity of material to be prepared in them, and in that this material is adversely affected both by its overheating in the vicinity of the heat input point and by the incomplete fusion of the layer which is in contact with the cold crystallizer. To improve the homogeneity and insure proper fusion of the material the charge has to be turned over and the smelting process repeated several times over. Vertical crystallizers in the shape of hollow cylinders with receding moving bottoms create another difficulty in that metal or other high-temperature material must be continuously added to them in the course of the smelting process, and that this added material must in most cases first be processed into some suitable form. When this smelting procedure is used in larger-diameter crystallizers, the heat flows to the upper surface of the smelted material must be precisely divided and distributed, which in electron beam and plasma furnaces calls for output control and directional orientation of the heat flows by means of several electron guns or plasmatrones. The most widely used smelting procedure employing vertical crystallizers does not permit satisfactory homogenization of the material, which consequently requires repeated re-smelting.

These disadvantages are eliminated by the present invention of a furnace for the smelting of metals and preparation of materials with high melting points, which incorporates a horizontal crystallizer in the shape of a trough formed by a system of not less than two working cylinders and limited in the axial direction by end plates. The essence of the invention is that the working cylinders revolve in the same direction of rotation. The system of working cylinders has a cross-section that is either V-shaped or comprises an arc at the bottom and two divergent lines of working cylinders above this arc. The working cylinders of the crystallizer are provided with support rolls to limit their deflection.

As compared to crystallizers with fixed horizontal working cylinders, this design with rotating working cylinders insures perfect fusion of the whole charge and a smooth surface of the resultant cylindrical ingot while preserving a protective layer of cooler material adjacent to the walls of the crystallizer. The smelting process in this crystallizer allows the direct melting of lumpy material or separate pieces of waste material without requiring either previous processing of this material or the addition of further material in the course of the process, as is usually necessary when smelting is performed in vertical crystallizers with receding moving bottoms. When adapted for zonal refining, this crystallizer permits a higher effective coefficient of distribution to be attained because of the absence of any layer of unfused material. Perfect homogenization of the melt can be achieved without any need to interrupt the process by means of repeated zonal melting with the molten zone advancing in alternate directions during consecutive cycles. Complete fusion of the whole cross-section of the charged material is insured by the crystallizer which in cross-section consists of an arc-shaped bottom and two divergent lines of cylinders above this bottom, as this layout permits the bottom of the crystallizer to be filled with molten material to a level beneath the center of the cylindrical ingot formed by the solidification of the melt. The functional principle of the crystallizer with rotating working cylinders permits a variety of control actions affecting the metallurgical and other preparatory processes to be performed in the course of the process itself without disturbing its continuity.

The attached drawing shows a schematic representation of an example of a furnace for the smelting of metals and preparation of materials with high melting points according to the present invention.

Figure 1:
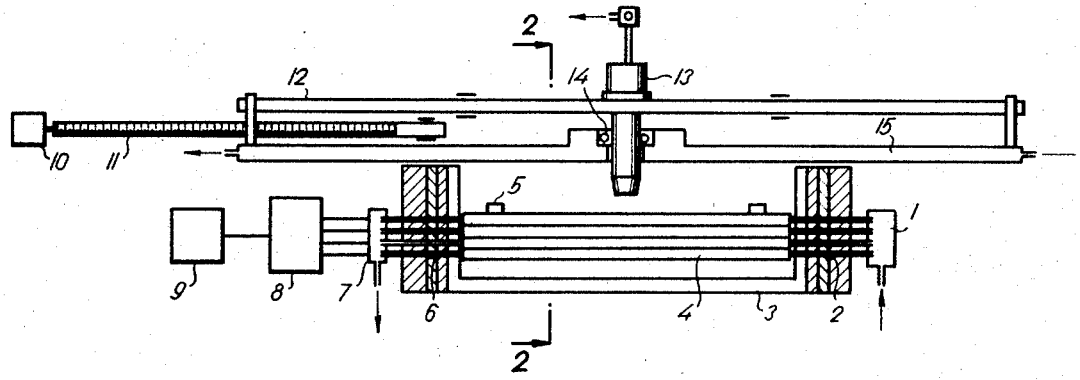
FIG. 1 illustrates the general arrangement of the furnace in elevation.
Figure 2:
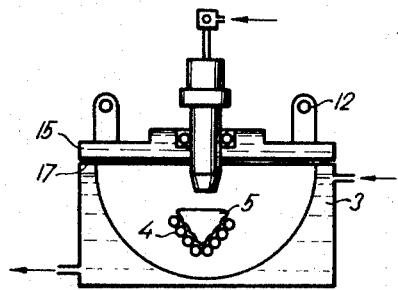
FIG. 2 is a cross-section through such a furnace with a trough-shaped crystallizer corresponding to the cross-section marked 2—2 in FIG. 1.
Figure 3:
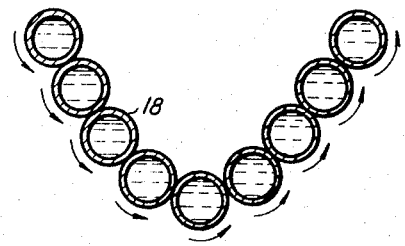
FIG. 3 is a cross-section through a crystallizer with working cylinders arranged to form an arc at its bottom and two divergent lines in its upper part.
Figure 4:
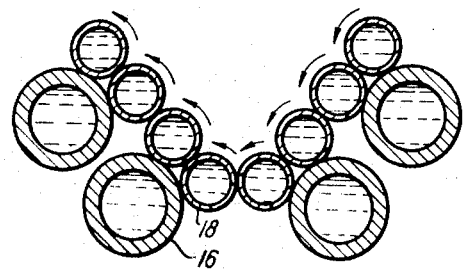
FIG. 4 depicts a cross-section through a crystallizer with a V-shaped cross-section and also shows the support rolls.

A furnace for the smelting of metals and preparation of materials with high melting points according to the illustrative embodiment of the present invention comprises a furnace shell 3 made up of an inner and an outer jacket and cooled by a flow of water, and a crystallizer 4 which consists of a system of working cylinders 18 that revolve in the same direction of rotation and are arranged so as to form a horizontal trough. The working cylinders 18 of crystallizer 4 are cooled by water which enters them through rotary joints at inlet 1 and leaves them through rotary joints at outlet 7. The cylinders 18 are driven by a motor 9 via a gearbox 8 which has its output shafts connected to the shafts of the cylinders 18, the latter being borne in bushings as shown at 2 and sealed by rubber rings 6. The bushings that bear the cylinders can be modified so as to transmit electric current to the crystallizer when electrically conductive materials are to be melted by means of an electron gun or plasmatrone or some other similar heat source. Both ends of the crystallizer 4 are fitted with water-cooled end plates 5 which limit the smelting space in the lengthwise direction. The open top of the furnace shell 3 is provided with a cover 15 which can be traversed longitudinally by means of a motor 10 and a lead screw 11. The cover 15 is guided by guide bars 12 so as to remain seated against the cover sealing means 17 located upon the furnace shell 3. Cover 15 carries a heat source 13 for instance a plasmatrone, which affords a highly concentrated heat flow, which, in view of the low gauge pressure of the furnace atmosphere, presents no great sealing problems. Heat source 13 passes through cover 15 and is provided with a seal 14 at this point. The equipment for zonal melting may comprise more than one heat source with output controls and can be arranged so as to permit simultaneous melting of the charged material and controlled solidification of the resultant ingots over the whole of their lengths without any mechanical longitudinal displacement of the heat sources relative to each other and to the crystallizer. The cylinders 18 of crystallizer 4 revolve in the same direction of rotation and may be fitted with support rolls 16, as indicated in FIG. 4, to restrict their deflection. Crystallizers of other shapes can be similarly fitted with support rolls.

In this furnace for the smelting of metals and preparation of materials with high melting points, the material placed in the cooled crystallizer 4 rotates and is simultaneously molten down by the heat source 13 which emits a highly concentrated heat flow. A suitably selected combination of heat input conditions, rates of rotation of the material, and possibly displacement of the heat source 13, can secure perfect fusion of the charged material throughout its entire cross-section while preserving a cooler layer suspended by surface tension or possibly even a partly solidified layer of material in the lower part of the ingot.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A furnace for the smelting of metals and preparation of materials with high melting points, comprising a furnace chamber, a source of heat for the chamber, a horizontal trough-shaped crystallizer in the furnace chamber, the crystallizer comprising at least two working cylinders rotatable about their axes and forming a trough, the trough being terminated in the lengthwise direction by transverse end plates, and means for rotating the working cylinders in the same direction of rotation about their axes.

2. A furnace according to claim 1, wherein the system of working cylinders of the crystallizer is V-shaped in vertical cross-section.

3. A furnace according to claim 1, wherein the system of working cylinders of the crystallizer has a vertical cross-section composed of an arc at the bottom and two divergent lines in its upper part.

4. A furnace according to claim 1, comprising support rolls beneath the working cylinders to limit their deflection.

5. A furnace according to claim 1, wherein the heat source is provided with a mechanism permitting its displacement along the longitudinal axis of the crystallizer.

* * * * *